Jan. 9, 1973  F. M. McNEILL  3,709,703
METHOD OF WINDING TUBULAR FILMS OR WEBS AND RESULTING PRODUCT
Filed Dec. 29, 1970  3 Sheets-Sheet 1

FRANK M McNEILL
INVENTOR.

BY his attorney

Jan. 9, 1973   F. M. McNEILL   3,709,703
METHOD OF WINDING TUBULAR FILMS OR WEBS AND RESULTING PRODUCT
Filed Dec. 29, 1970   3 Sheets-Sheet 2
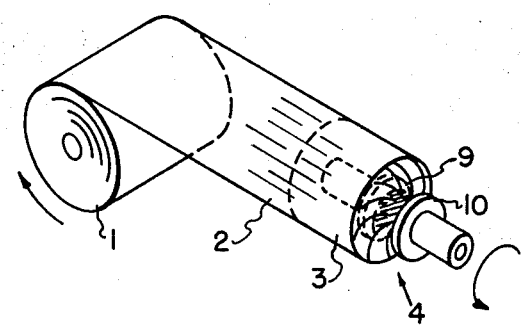
FIG. 6
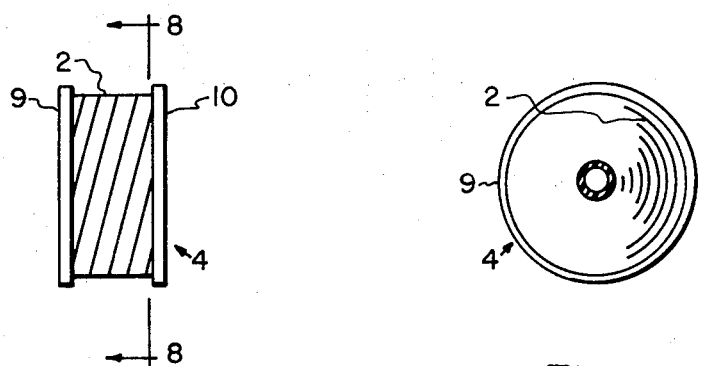
FIG. 7
FIG. 8
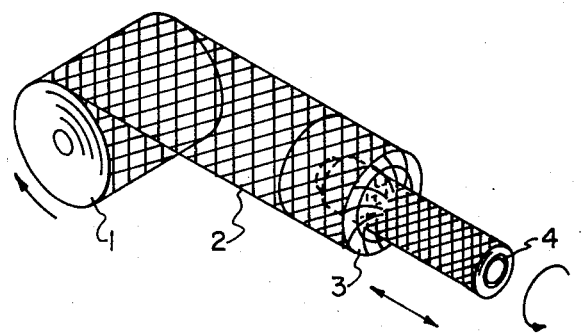
FIG. 9
FRANK M McNEILL
*INVENTOR.*
BY
his attorney Jan. 9, 1973　　　　　F. M. McNEILL　　　　　3,709,703
METHOD OF WINDING TUBULAR FILMS OR WEBS AND RESULTING PRODUCT
Filed Dec. 29, 1970　　　　　　　　　　　　　3 Sheets-Sheet 3

FRANK M McNEILL
*INVENTOR.*

BY　*Neal J Mosely* his attorney

United States Patent Office 3,709,703
Patented Jan. 9, 1973

3,709,703
METHOD OF WINDING TUBULAR FILMS OR WEBS AND RESULTING PRODUCT
Frank M. McNeill, Danville, Ill., assignor to Tee-Pak, Inc., Chicago, Ill.
Filed Dec. 29, 1970, Ser. No. 102.458
Int. Cl. A22c 13/00; B65d 85/67
U.S. Cl. 99—176                                 9 Claims

ABSTRACT OF THE DISCLOSURE

Flexible tubular material such as tubular films, foils, or webs are inflated or otherwise held in an expanded condition and wound radially inward on a supporting core. The resulting radially wound flexible tubular material is a novel product. The tubular material may be pulled off or fed from either end of the radially wound material and may be continuously filled by introduction of any desired material through the hollow supporting core or through the radially wound material itself in the event that the core has been removed.

BACKGROUND OF THE INVENTION

Field of the invention

This invention relates to the winding of hollow, flexible tubular material in a manner which permits the tubular material to be removed from its support and simultaneously filled continuously for packaging or other purposes.

Description of the prior art

Flexible tubular material, such as tubular films, foils, webs (including paper, fabrics, nets and the like) have in the past either been provided in the form of short pieces which can be easily opened and filled as packages or wound as flattened tubes on suitable spools or cores for storage. When tubular material has been provided in the form of a flattened tube wound on a spool or core, it has been used by unwinding from the core and opening and filling in discrete segments. There hs been no practical way to fill a tubular material which is wound on a support other than by puncturing and resealing. In the meat packing industry, artificial sausage casings, which are a specialized type of tubular material, are shirred (pleated) from lengths ranging from 40 to 160 feet or more down to a shirred and compressed length of the order of a few inches. The shirred or pleated form of the casing is filled by placing on a stuffing horn and a meat emulsion extruded to fill the casing to its fully extended length. Apparatus for shirring casings (which could also be used for shirring other tubular materials) is shown in Dietrich U.S. Patent 2,010,626, Korsgaard U.S. Patent 2,583,654, Blizzard et al. U.S. Patents 2,722,714, 2,722,715, 2,723,- 201, Gimble U.S. Patent 2,819,488, and Matecki U.S. Patents 2,983,949, and 2,984,574. Shirring processes, as carried out by the above-mentioned patents, are generally limited to the shirring of relatively small diameter flexible tubing and are not generally applicable to the shirring of paper, webs, nets, or foils. Also, shirring processes produce a product in a pleated form which is quite difficult to handle in the case of great lengths of shirred material. In general the prior art does not teach any method of winding, compacting or storing tubular material which permits continuous filling of the tubular material other than the processes and apparatus for shirring artificial casings as illustrated by the patents listed above.

SUMMARY OF THE INVENTION

This invention relates to a new and improved process for winding tubular products such as tubular films or casings, tubular netting, tubular fabric, tubular paper, or tubular metal foil, and to the novel product of this method. In carrying out this method, a thin-walled tubular material, such as a tubular film or the like, is taken from a storage reel, slack box or tube forming process and expanded to a fully opened or inflated condition. In a preferred embodiment of the invention the expanded tubular material is passed over a hollow cylindrical forming mandrel. The tubular product is secured radially inward on a supporting spool or core which is wound and preferably reciprocated back and forth in relation to the inflated tubular material or back and forth in relation to the cylindrical mandrel over which the inflated tubular material is drawn. As the support is rotated the tubular material is drawn inward radially of itself and is wound on the support in a plurality of overlapping spiral folds or pleats. When the product is radially wound in this manner on a tubular support, the resulting radially wound product may be filled through the hollow support continuously for purposes of packaging. If a solid support is used for radial winding of the tubular material, then it is necessary that the support be removed from the radially wound material in order that the material be filled for packaging through its interior. The novel, radially wound product which is produced in accordance with this method is particularly useful for the continuous packaging of ground meat products in the form of sausages or loaves and for the packaging of small particulate items. Packages may be formed of the tubular material by removal of the same from its radially wound condition and forming spaced closures while filling the resulting packages through the core of the radially wound material.

BRIEF DESCRIPTION OF THE DRAWING

FIG. 6 is a diagrammatic view illustrating an embodiment of the method of radial winding of tubular materials in which the winding core is not reciprocated within the guiding mandrel.

FIG. 7 is a view in side elevation of radially wound product produced in accordance with the method of FIG. 6.

FIG. 8 is a sectional view taken on the line 8—8 of FIG. 7.

FIG. 9 is a diagrammatic view illustrating the radial winding of fabric or netting in accordance with the method substantially as illustrated in FIG. 1.

DESCRIPTION OF THE PREFERRED EMBODIMENTS

This invention consists of an improved method of winding tubular materials by expanding or inflating said materials, holding the material in an expanded or inflated condition, and winding the material radially inward on a hollow support or on a solid support which may be removed for filling packages of the material by introduction through the hollow core thereof. Any type of tubular material which is sufficiently flexible may be wound in accordance with this invention. Typical materials are thin-walled thermoplastic tubular films or casings, tubular nettings, tubular fabrics, paper tubes, and tubes of thin metal foils. Materials such as paper, paper-reinforced casings, metal foils, and the like are stiffer and more difficult to wind than thin-walled tubular films or casings or netting or fabric but may nevertheless be wound in accordance with this invention.

Figure 1:
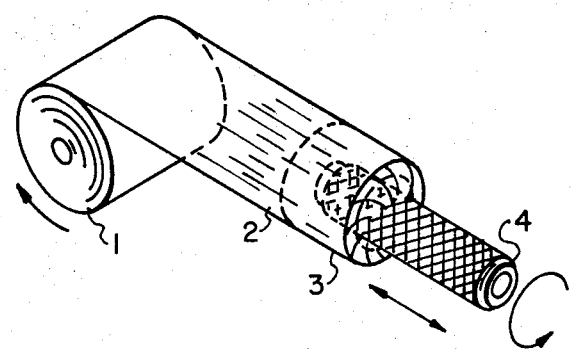
FIG. 1 is a diagrammatic view illustrating a preferred embodiment of the improved method of winding tubular products.

In FIG. 1, a reel 1 of tubular material is unwound as indicated by the directional arrow. The tubular material, which is preferably a thin-walled plastic film, such as polyethylene film, or a thin-walled casing of regenerated cellulose or the like, either unreinforced, or reinforced with paper or other fibrous material, is removed from reel 1, inflated at 2, and passed over a hollow-forming mandrel 3. The casing or tubular film is preferably maintained in an inflated condition for ease of movement past mandrel 3 by introduction of compressed air through the supporting core for the wound product. The tubular film or casing material is drawn inward around guide mandrel 3 and secured to winding core 4 which is continuously rotated in the same direction as indicated by the directional arrow adjacent to said core. As the supporting core 4 is rotated it is reciprocated into and out of the guide mandrel 3 as indicated by the directional arrows positioned approximately parallel to the guide core in the drawing. As the supporting core 4 is continuously rotated and simultaneously reciprocated into and out of the guide mandrel 3 the film or casing material is wound radially inward of itself in a plurality of overlapping layers. This winding procedure is continued until the amount of casing wound on the supporting core either exhausts the reel 1 or reaches the internal diameter of the guide mandrel 3, at which point the winding process is stopped and the product removed from the process.

In FIG. 1, the process is illustrated strictly in terms of the relative movement of the product being handled and the members used to carry out the process. The process can be mechanized in a much more sophisticated manner than illustrated in FIG. 1 provided that the mechanism carries out these essential relative movements. The essential features of the process are that the tubular material be sufficiently flexible to wind in the manner illustrated and that it be inflated sufficiently and wound radially onto a suitable support. The winding is accomplished by a relative motion of the expanded film in relation to the supporting core. While the core is shown as being rotated in relation to the expanded tubular material and the guide mandrel, it is obvious that a reversal of these relative motions could be effected with the identical end result. Thus, while it would be much more complicated and uneconomical, the expanded casing 2 could be rotated in relation to a stationary winding core. Similarly, the guide mandrel 3 could be reciprocated longitudinally in relation to a stationary winding core to accomplish the same result as a reciprocating core. Thus, when the motions of any of the parts involved in the process, as illustrated in FIG. 1 or in any of the other figures, are described in terms of the motion of one part, such description is intended to encompass the described motion as a relative motion between the respective parts and includes the appropriate reversal of the parts to accomplish the same result. The method shown in FIG. 1, is strictly diagrammatic and does not include all of the necessary supporting structure for a complete apparatus to carry out the described method. Thus, in a complete apparatus for carrying out the method, supporting mandrel 3 would be provided with an appropriate support. Mandrel 3 could be supported on a suitable supporting member extending through the winding core 4 or could be supported externally by an electromagnetic field as the core of a solenoid coil, if the mandrel 3 were made of magnetic material. A complete apparatus for carrying out the method would also involve mechanical means, which could be hand operated or motor driven for rotating the winding core.

Figure 2:
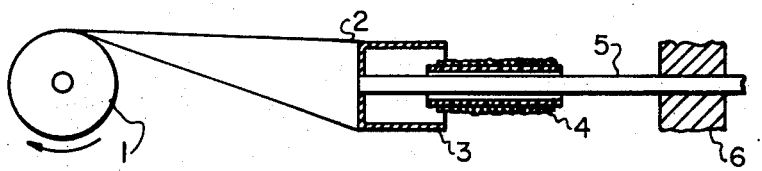
FIG. 2 is a diagrammatic view in side elevation illustrating a preferred embodiment of the method of winding tubular products in which the guiding mandrel and the winding roller are supported on a common support and may be independently rotated.

In FIG. 2, the method of FIG. 1 is illustrated in side elevation with additional diagrammatic details given of the means used to carry out the process. The roll 1 of tubular plastic film or casing is expanded at 2 and passed over guide mandrel 3 and wound on supporting core 4. Guide mandrel 3 is supported on rod 5 which extends through supporting core 4 and is supported in an external support shown diagrammatically at 6. Rod 5 may be stationary for rotation of winding core 5 thereon or may be rotated, by hand or by suitable motor driven means, in a direction opposite to the direction of rotation of winding core 4. This rotation of rod 5 is effective to rotate guide mandrel 3 to compensate for a slight tendency of the film to twist between the mandrel 3 and the reel 1.

Figure 3:
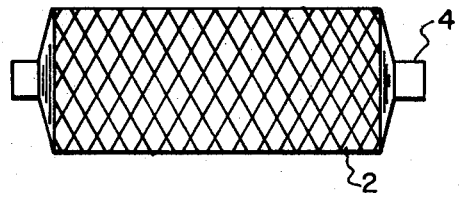
FIG. 3 is a view in side elevation of the radially wound product produced in accordance with this invention.
Figure 4:
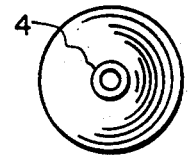
FIG. 4 is a view in end elevation of the product illustrated in FIG. 3.
Figure 5:
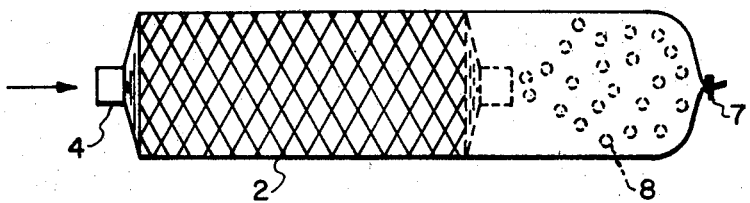
FIG. 5 is a view illustrating the filling of radially wound product through the supporting core.

The product produced in accordance with the process illustrated in FIGS. 1 and 2, as described above, is shown in FIGS. 3 and 4 and consists of the radially wound film or casing 2 on the hollow supporting core 4. In FIG. 5, there is illustrated the use of the radially wound product in a process of continuous filling and packaging. The tubular material is pulled off one end of the supporting core and closed off by a suitable tie or clip 7 to form the start of a package. The material which is being packaged is introduced through the hollow core 4 as indicated by the directional arrow adjacent thereto and comprises a plurality of articles 8 of a size sufficiently small to be introduced through the core. As the material 8 is introduced through core 4, it fills the tubular film or casing being removed from the supporting core and may be tied off or otherwise secured in a plurality of separate packages by ties or clips applied to spaced lengths of the tubular material. In some cases, as in the packaging of grain or particulate materials such as flour or carbon black, an entire length of tubular film may be filled as a single package and provided with a suitable container or support for transportation and use. The radially wound film or casing or other tubular material is applicable to a large variety of uses where continuous filling of a tubular material is required or where it is desired to continuously remove material from a supporting roll in an expanded or inflated condition. In some cases, it is possible that it might be desirable to wind the tubular material on a solid winding core which is subsequently removed from the radially wound product. In such a case, the radially wound material can be filled by introduction of the material to be packaged directly through the longitudinal central passage in the radially wound material instead of through a hollow supporting core.

In the embodiment of the invention illustrated in FIG. 6 there is shown a method for radial winding of flexible thin-walled tubular materials using a winding spool or core which is not reciprocated within the guide mandrel. In this embodiment, a thin-walled tubular material such as plastic film, casing, or the like is supplied in the form of a reel 1 which is unwound as indicated by the directional arrow adjacent to the reel. The tubular material removed from the reel is expanded or inflated as at 2 and passed over a guide mandrel 3 which is positioned adjacent to a supporting core or spool 4. The supporting core or spool 4 has side walls 9 and 10 which form a winding spool. In carrying out this embodiment of the radial winding method, the tubular film or casing or other tubular material is inflated and drawn over guide mandrel 3 and drawn radially inward and secured to the core portion of the winding spool 4. As the spool 4 is rotated, as indicated by the directional arrow adjacent thereto, it is not reciprocated as in the embodiments of FIGS. 1 and 2. The rotating spool is maintained in a fixed position adjacent to the end of guide mandrel 3 and winds the casing radially on the core of the spool. Since the spool is not reciprocated the radially wound material accumulates in a plurality of overlapping layers which are relatively narrow and are confined in the space between the side walls 9 and 10 of the spool. The side walls 9 and 10 on the spool are necessary to prevent the wound material from becoming laterally displaced and producing a poor product. The radial wound product produced by this modification of the radial winding method is shown in FIGS. 7 and 8. The radial wound material can be pulled off the spool over either of the end walls 9 and 10 and the tubular material filled through the hollow supporting core.

In FIG. 9 of the drawings the method of FIGS. 1 and 2 is illustrated for application to the radial winding of tubular fabric or tubular netting. In FIG. 9, there is provided a roll of tubular fabric or netting generally designated 1 which is unwound by rotation as indicated by the directional arrow. The tubular fabric or netting is expanded as indicated at 2 and passed over a guide mandrel 3 and radially wound on a hollow core 4. The hollow core 4 is rotated as indicated by the directional arrow adjacent to the end of the core and reciprocated within hollow guide mandrel as indicated by the directional arrow positioned approximately parallel to the core. In this embodiment of the invention, the fabric or netting being radially wound on core 4 does not need to be inflated with compressed air as is usually done in the radial winding of tubular films, casings, foils, paper, etc. The tubular fabric or netting is maintained in its opened or inflated condition for radial winding by passing over the tubular guide mandrel 3. As the core 4 is rotated and reciprocated in relation to guide mandrel 3 the tubular netting or fabric is radially wound on the core until a desired amount is positioned thereon. Usually, the limit of radial winding on a rotary core is determined by the point at which the radial wound material reaches the inner surface of the guide mandrel and prevents further winding. In this embodiment of the invention, the guide mandrel 3 and the supporting core 4 are operated substantially the same as in the embodiments shown in FIGS. 1 and 2. The guide mandrel 3 may be supported by any suitable means external or internal, including the rod or axle on which the core 4 is rotated and reciprocated. If desired, as in the embodiment shown in FIG. 2, the guide mandrel 3 may be rotated slowly in a direction counter to the direction of winding of rotary core 4 to prevent the twisting of the fabric between mandrel 3 and roll 1. As noted above, the principal difference between this embodiment of the method and the ones described in connection with FIGS. 1 and 2 of the drawings is that no means need be provided for introducing compressed air through the core 4 to inflate the tubular material being wound.

Figure 10:
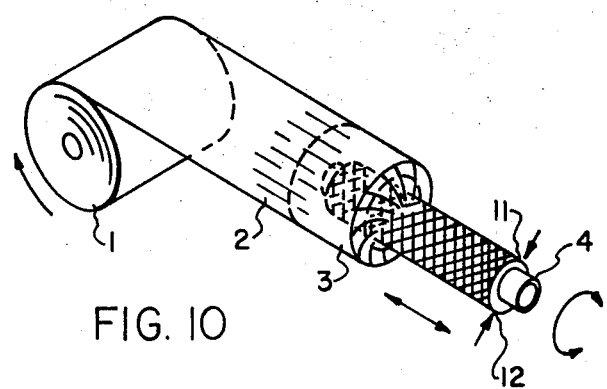
FIG. 10 is a diagrammatic view of still another embodiment of the invention in which a tubular product is passed over a guiding mandrel and wound on a core which is reciprocally rotated.

In FIG. 10 of the drawings there is illustrated still another embodiment of the method of radial winding in which the tubular material is wound first for a predetermined distance in one direction and then for a predetermined further distance in the opposite direction on the supporting core. This embodiment of the invention avoids to a substantial degree the problem of twisting of the tubular material when it is pulled off the supporting core and filled. In the embodiment of the invention illustrated in FIG. 10, there is provided a roll 1 of tubular film or casing or other tubular material which is unwound as indicated by the directional arrow adjacent to the roll. The tubular material is expanded or inflated as at 2 and passed over a guide mandrel or sleeve 3. A hollow roll or core 4 is provided for radial winding of the product. The tubular material is expanded around the guide sleeve or mandrel 3, preferably by means of compressed air or gas introduced through roll 4. The tubular material is drawn radially inward from the periphery of the guide sleeve or mandrel 3 and attached to core 4 for winding thereon. The core 4 is first wound in one direction while slowly reciprocating within the guide mandrel 3. Core 4 is reciprocated as indicated by directional arrows lying approximately parallel to the core in the drawing. Core 4 is firs turned in one direction for a predetermined desired time to wind a selected amount of the tubular material radially in one direction. Then, when the material is wound to one end of the supporting core it is grasped by application of either manual or mechanical pressure at points 11 and 12 as indicated by arrows adjacent to the end of the core. The casing or other tubular material is held and core 4 is rotated in the opposite direction for a predetermined distance until a selected amount of the tubular material has been radially wound in the opposite direction on the supporting core. The core 4 is thus rotated first in one direction to wind the tubular material thereon in that direction and then rotated in the opposite direction to wind further layers of material in the opposite direction. The reversal of rotary movement of core 4 is indicated by the directional arrows adjacent to the end of the core. The product which is produced by this embodiment of the radial winding method comprises a series of layers of the tubular material radially wound first in one direction and then in the other direction on the supporting core. The product can be pulled off the supporting core and filled with material introduced through the hollow core. The reversal of winding reduces the amount of twisting of the material as it is being filled.

Figure 11:
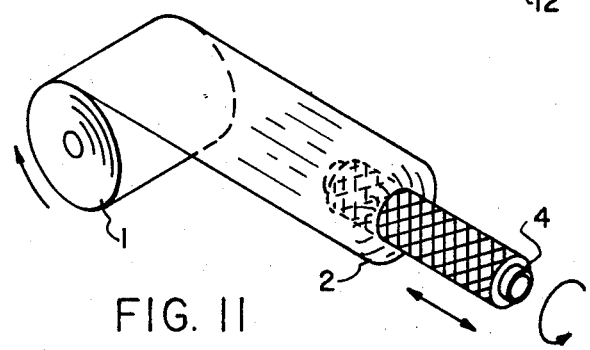
FIG. 11 is a diagrammatic view of still another embodiment of the invention in which a tubular product is radially wound on a supporting core under pneumatic pressure without the use of a guide mandrel.

In FIG. 11 there is illustrated a further embodiment of the invention in which a tubular imperforate material such as a film, foil, or casing is radially wound on a core without the use of a guide mandrel. In this embodiment of the invention a tubular plastic material or casing is removed from roll 1 which is rotated as indicated in the directional arrow adjacent to the end of the roll. The tubular material is expanded as indicated at 2 by air or gas pressure introduced through winding roll 4. Sufficient pressure is maintained inside the inflated casing 2 to keep it firmly inflated. The casing is first pulled radially inward and wound on core 4. Core 4 is rotated continuously as indicated by the directional arrow adjacent to the end of the core and is reciprocated inwardly and outwardly in relation to the end of the casing or tubular film being wound as indicated by the arrow extending approximately parallel to the core. The rotary core 4 is continuously rotated and slowly moved inwardly and outwardly of the end of the casing or tubular film while maintaining the film or casing firmly inflated with gas pressure. The gas pressure within the casing or film keeps it fully expanded and permits the casing to be radially wound on the supporting core. This technique of winding produces a radially wound product which is substantially the same as that obtained where the casing is inflated and pulled over a guide mandrel. Furthermore, this embodiment of the radial winding method is not limited to the internal diameter of the guide mandrel as in the other embodiments of the method and larger amounts of film or casing can be wound on the supporting core by increasing the gas or air pressure applied to the interior of the film or casing as the amount of material on the core approaches the diameter of the inflated film.

Figure 12:
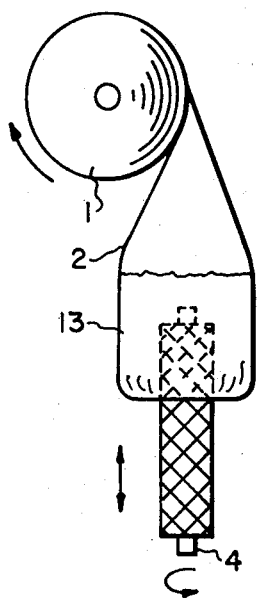
FIG. 12 is a diagrammatic view of still another embodiment of the invention in which a tubular material is radially wound on a supporting core under a hydrostatic head without a guide mandrel.

In FIG. 12 of the drawings there is shown a still further embodiment of the invention in which the tubular film or casing is radially wound on a supporting core using an internal slug of liquid to keep the tubular material fully inflated in lieu of using a guide mandrel. This embodiment of the invention is similar to that illustrated in FIG. 11 in that it is applicable only to the winding of imperforate materials. In this embodiment, a tubular plastic film or casing or foil is supplied in the form of a roll 1 and is unwound as indicated by the directional arrow adjacent to the roll. The casing or foil or film is opened up and filled with a slug of liquid, such as water, to provide a means to keep the casing inflated during winding. The supporting core 4 is introduced into the end of the casing and is twisted to start the casing winding tightly thereon. The tubular casing or film and winding core 4 are then moved into a vertical position so that the slug of liquid 13 within the film causes it to be fully expanded or indicated at 2 in the drawing. The supporting core 4 is rotated as shown by the directional arrow adjacent to the end of the core and is reciprocated vertically as indicated by the directional arrows positioned approximately parallel to the core. As the supporting core 4 is continuously rotated and moved vertically up and down into the expanded casing or film the tubular material is wound radially on the core to produce a radially wound product substantially the same as that obtained by the method of FIG. 11. The principal difference between this method and the one described in connection with FIG. 11 is that the use of a slug of liquid to maintain the casing in an inflated or expanded condition during winding avoids the necessity for the continuous introduction of compressed air to open up the tubular material as it is unwound from the supporting reel. The term "radial winding," as used herein, refers to a method in which a tubular material is passed over and surrounds a winding support or core, preferably in an inflated condition, is drawn radially inward, and wound around the support in a plurality of overlapping layers.

I claim:

1. As an article of manufacture, a flexible thin-walled tubular material wound radially of itself in a plurality of twisted, overlapping, reverse folds or pleats.

2. An article of manufacture in accordance with claim 1 in which said tubular material is a tubular plastic film.

3. An article of manufacture in accordance with claim 1 in which said tubular material is a meat casing.

4. An article of manufacture in accordance with claim 1 in which said tubular material is paper.

5. An article of manufacture in accordance with claim 1 in which said tubular material is metal foil.

6. An article of manufacture in accordance with claim 1 in which said tubular material is net.

7. An article of manufacture in accordance with claim 1 in which said tubular material is fabric.

8. An article of manufacture in accordance with claim 1 in which said tubular material is wound on a supporting core.

9. An article of manufacture in accordance with claim 8 in which said supporting core is a hollow tube.

References Cited

UNITED STATES PATENTS

| | | | |
|---|---|---|---|
| 3,426,892 | 2/1969 | Poney | 206—59 R |
| 3,148,991 | 9/1964 | Svendsen | 206—46 F X |
| 2,880,902 | 4/1959 | Owsen | 220—8 |
| 3,650,298 | 3/1972 | Delmar | 206—46 R X |

LEONARD SUMMER, Primary Examiner

U.S. Cl. X.R.

206—59 R